(12) United States Patent
Mazumdar et al.

(10) Patent No.: US 8,550,008 B2
(45) Date of Patent: Oct. 8, 2013

(54) SYSTEM AND METHOD FOR REINJECTION OF RETARD ENERGY IN A TROLLEY-BASED ELECTRIC MINING HAUL TRUCK

(75) Inventors: Joy Mazumdar, Norcross, GA (US); Walter Koellner, Suwanee, GA (US)

(73) Assignee: Siemens Industry, Inc., Alpharetta, GA (US)

(*) Notice: Subject to any disclaimer, the term of this patent is extended or adjusted under 35 U.S.C. 154(b) by 0 days.

(21) Appl. No.: 13/425,927

(22) Filed: Mar. 21, 2012

(65) Prior Publication Data

US 2012/0175209 A1    Jul. 12, 2012

Related U.S. Application Data

(62) Division of application No. 12/604,571, filed on Oct. 23, 2009.

(51) Int. Cl.
*B60L 11/00*    (2006.01)

(52) U.S. Cl.
USPC .......................................... 104/289; 191/33 R

(58) Field of Classification Search
USPC ........ 104/287, 288, 289, 291, 292; 191/22 R, 191/29 R, 29 DM, 33 R, 35, 36, 22 C
See application file for complete search history.

(56) References Cited

U.S. PATENT DOCUMENTS

| | | | | |
|---|---|---|---|---|
| 3,847,089 A | * | 11/1974 | Nelson | 104/291 |
| 4,358,719 A | * | 11/1982 | Currier et al. | 318/161 |
| 5,351,775 A | * | 10/1994 | Johnston et al. | 180/65.31 |
| 5,582,262 A | * | 12/1996 | Wust | 180/2.1 |
| 5,886,619 A | * | 3/1999 | Takasan et al. | 370/276 |
| 6,268,673 B1 | * | 7/2001 | Shah et al. | 310/90.5 |
| 6,396,178 B1 | * | 5/2002 | Chiu | 310/67 R |
| 6,612,245 B2 | * | 9/2003 | Kumar et al. | 105/26.05 |
| 6,619,212 B1 | * | 9/2003 | Stephan et al. | 104/292 |
| 6,646,360 B2 | * | 11/2003 | Brown | 307/43 |
| 6,651,566 B2 | * | 11/2003 | Stephan et al. | 104/288 |
| 6,742,630 B2 | * | 6/2004 | Eilinger | 187/290 |
| 7,812,555 B2 | * | 10/2010 | Adra | 318/376 |
| 8,054,016 B2 | * | 11/2011 | Gottemoller et al. | 318/380 |
| 8,069,792 B2 | * | 12/2011 | Shapery | 104/287 |
| 8,140,206 B2 | * | 3/2012 | Bailey et al. | 701/22 |
| 2002/0014383 A1 | * | 2/2002 | Brooks | 191/33 R |

(Continued)

FOREIGN PATENT DOCUMENTS

| | | |
|---|---|---|
| DE | 3235107 A1 | 4/1983 |
| DE | 4239164 C1 | 4/1994 |

(Continued)

OTHER PUBLICATIONS

PCT International Search Report mailed Jan. 20, 2012 corresponding to PCT International Application No. PCT/US2010/045006 filed Aug. 10, 2010 (10 pages).

*Primary Examiner* — Jason C Smith

(57) ABSTRACT

Retard energy regenerated from an electrical motor during braking action is reinjected into a power system via trolley lines. The retard energy may be transmitted to a bidirectional electric substation and returned to a utility grid. The retard energy may also be transmitted to an auxiliary energy storage system, such as an ultracapacitor system or a battery system. Installing trolley lines for mining haul trucks on a downhill slope may be used to capture and re-use substantial quantities of retard energy.

18 Claims, 11 Drawing Sheets

(56) References Cited

U.S. PATENT DOCUMENTS

| | | | |
|---|---|---|---|
| 2003/0173172 A1* | 9/2003 | Stephan et al. | 191/10 |
| 2005/0178632 A1* | 8/2005 | Ross | 191/10 |
| 2009/0032350 A1* | 2/2009 | Shapery | 191/10 |
| 2009/0127048 A1* | 5/2009 | Ichimura | 191/33 R |
| 2010/0063646 A1* | 3/2010 | Ibaiondo Madariaga et al. | 700/297 |
| 2010/0282557 A1* | 11/2010 | He et al. | 191/33 R |
| 2010/0289443 A1* | 11/2010 | Mazumdar et al. | 318/440 |
| 2010/0300780 A1* | 12/2010 | Caruso et al. | 180/65.21 |
| 2011/0094808 A1 | 4/2011 | Koellner | |
| 2011/0094841 A1* | 4/2011 | Mazumdar et al. | 191/33 R |
| 2011/0175579 A1* | 7/2011 | Mazumdar | 320/167 |
| 2012/0085612 A1* | 4/2012 | Churchill | 191/33 R |

FOREIGN PATENT DOCUMENTS

| | | |
|---|---|---|
| DE | 19823233 A1 | 12/1999 |
| EP | 1350666 A1 | 10/2003 |
| EP | 1939030 A1 | 7/2008 |
| EP | 1985490 A1 | 10/2008 |
| JP | 58152629 A | 9/1983 |
| WO | WO 2010023033 A1 | 3/2010 |
| ZA | 9903472 A | 11/1999 |

* cited by examiner

SYSTEM AND METHOD FOR REINJECTION OF RETARD ENERGY IN A TROLLEY-BASED ELECTRIC MINING HAUL TRUCK

CROSS-REFERENCE TO RELATED APPLICATIONS

This application is a divisional of prior application Ser. No. 12/604,571, filed on Oct. 23, 2009, which is herein incorporated by reference in its entirety. This application is related to U.S. patent application Ser. No. 12/604,580, entitled Peak Demand Reduction in Mining Haul Trucks Utilizing an On-Board Energy Storage System, filed on Oct. 23, 2009, which is herein incorporated by reference in its entirety.

BACKGROUND

The present invention relates generally to power systems for mining haul trucks, and more particularly to a system and method for reinjection of retard energy in a trolley-based electric mining haul truck.

Mining haul trucks are typically equipped with electrical drive motors. Under some travel conditions, such as inside a mining pit, around a crusher, and on level surfaces, electrical power is supplied by an electrical generator powered by a diesel engine. Under more demanding conditions, electrical power is supplied by a trolley line. The haul truck draws electrical power from the trolley line via a pantograph. In particular, trolley lines are commonly used when a haul truck is filled with payload inside a mining pit and transports the payload along an uphill grade to the surface. During downhill travel, power supplied by the diesel engine is adequate, and there is typically no need to install a trolley line (which may be expensive) along the downhill path.

The electrical power drawn from the trolley line exhibits large dynamic swings. When the haul truck with a heavy load is accelerating on an uphill grade, for example, the peak power demand may exceed twice the average power demand. High peak power demand has a negative impact on both the electrical utility company and the mining operator. The high peak power demand may overload the electrical utility substation supplying electrical power to the trolley line. Voltage sags, or even outages, may result. High peak power demand may also overheat the trolley line cables and the pantograph contacts, leading to increased failure rates.

In addition to improved performance and reliability, there is also an economic incentive for reducing peak power demand. Electrical power utility companies supplying power to the mines typically measure the power demand of a mine based on 15-minute intervals, and billing is adjusted for peak power demand during each 15-minute interval. What are needed are method and apparatus for reducing power drawn by haul trucks from an electrical power utility. Method and apparatus which reduce wasted energy are particularly advantageous.

SUMMARY

In one embodiment, retard energy regenerated from an electrical motor during braking action is reinjected into a power system via trolley lines. The retard energy may be transmitted to a bidirectional electric substation and returned to a utility grid. The retard energy may also be transmitted to an auxiliary energy storage system, such as an ultracapacitor system or a battery system. In another embodiment, the retard energy is first used to charge an on-board electrical energy storage system. When the on-board electrical energy storage unit is fully charged, the excess retard energy is transmitted to the trolley lines. Installing trolley lines for mining haul trucks on a downhill slope may be used to capture and re-use substantial quantities of retard energy.

These and other advantages of the invention will be apparent to those of ordinary skill in the art by reference to the following detailed description and the accompanying drawings.

DETAILED DESCRIPTION

Figure 1:
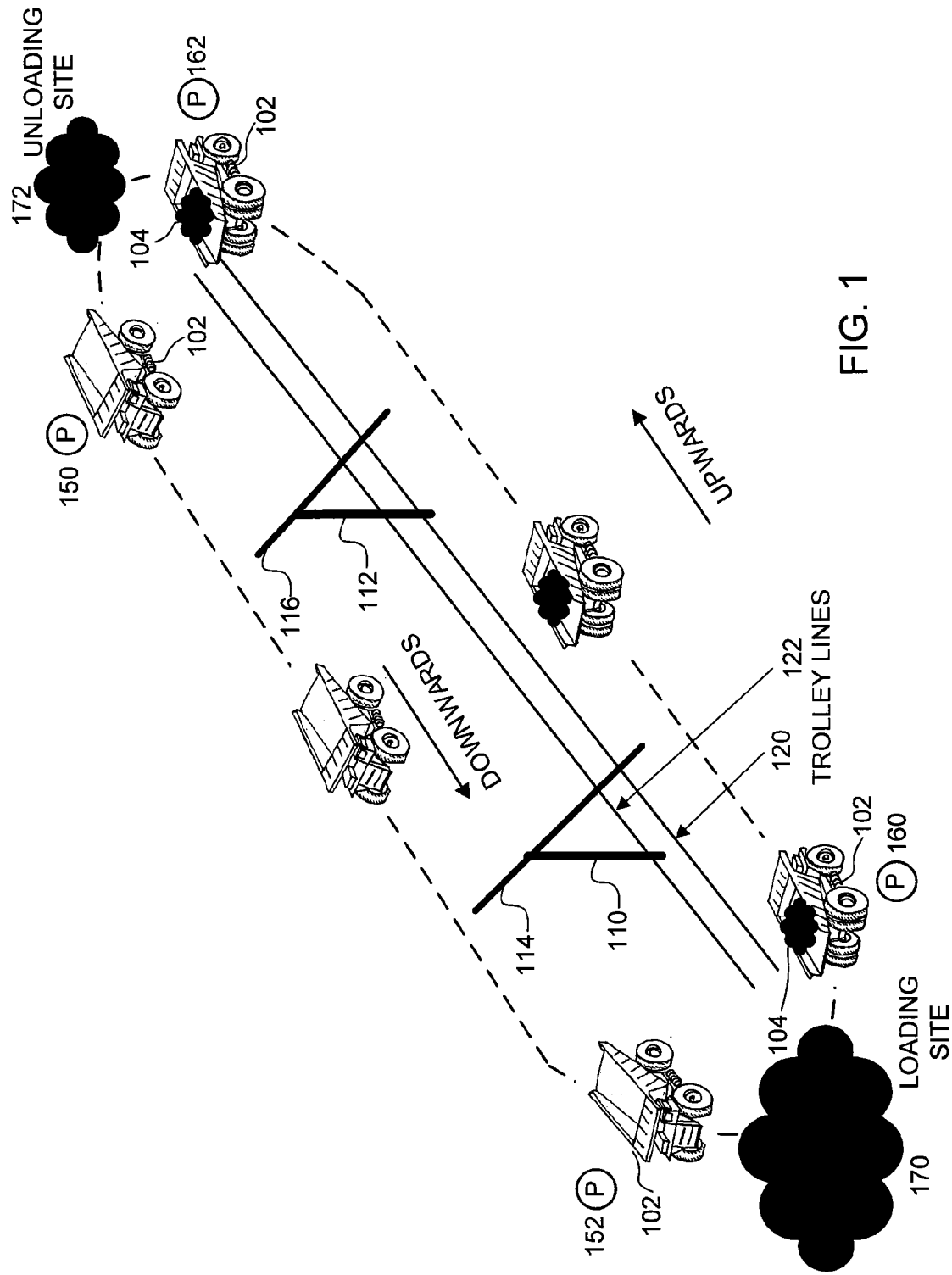
FIG. 1 shows a schematic of a mining operation in which a haul truck hauls payload uphill.

FIG. 1 shows a schematic of a typical mining operation. An empty mining haul truck 102, shown at position P 152, enters loading site 170 in a mining pit, where it fills up with payload 104 (for example, ore). Haul truck 102 with payload 104, shown at position P 160, starts its uphill climb, reaching the surface, shown at position P 162. Haul truck 102 then dumps its payload 104 at unloading site 172. The empty haul truck 102, shown at position P 150, then starts its downhill descent, arriving again at position P 152. It then fills up with a second payload 104 at loading site 170 and repeats its uphill trip.

Figure 2:
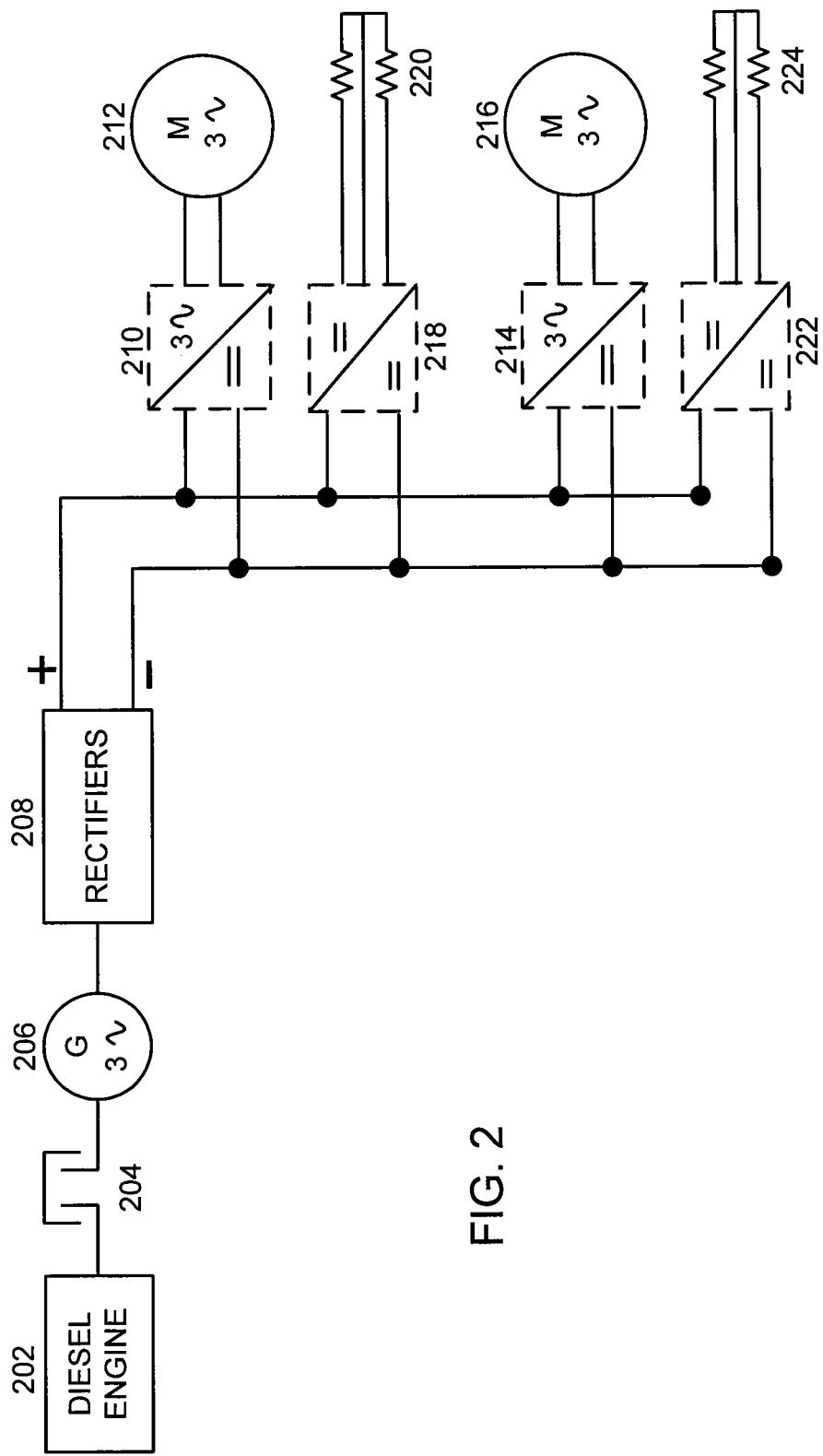
FIG. 2 shows a single-line diagram of a diesel-powered electrical power system for a haul truck.

Mining haul trucks are typically equipped with electrical drive motors. FIG. 2 shows a single-line diagram of a haul truck power system. The haul truck has two drive wheels. Each wheel is driven by a 3-phase alternating-current (AC) wheel motor (M). The wheel motors are referenced as wheel motor 212 and wheel motor 216. Electrical power is supplied by a diesel engine 202 driving a 3-phase AC generator (G) 206. (Other types of mechanical engines may be used; diesel engines are typical in mining operations.) Coupling 204 connects diesel engine 202 to generator 206. Diesel engine 202 and generator 206 are mounted on the haul truck. The AC output of generator 206 is fed into rectifiers 208. The direct current (DC) output of rectifiers 208 is fed into a set of inverters. Inverters 210 supply 3-phase AC power to wheel motor 212. Similarly, inverters 214 supply 3-phase AC power to wheel motor 216.

In the power system shown in FIG. 2, the entire power requirements for wheel motor 212 and wheel motor 216 are supplied by diesel engine 202. Performance (as determined, for example, by acceleration and speed) of the haul truck is limited by the power capacity of the diesel engine. In the scenario shown in FIG. 1, when the haul truck 102, filled with a heavy payload 104, is travelling along an uphill grade (such as from position P 160 to position P 162), the diesel engine may be stressed to maximum capacity. One method for reducing the power demand on the diesel engine as the haul truck 102 travels on an uphill grade is to power the wheel motors entirely via electrical power drawn from an overhead trolley power system. During this operational mode, the generator 206 is disconnected from diesel engine 202 via coupling 204. The diesel engine then idles on uphill grades. As a result, fuel consumption is reduced by ~95%; noise and exhaust emissions are reduced; and productivity and engine life are increased.

Shown in FIG. 1 are trolley line 120 and trolley line 122, supported overhead by support arm 114 mounted on support pole 110 and by support arm 116 mounted on support pole 112. A trolley line is also referred to as an overhead line. To simplify the drawing, the electrical connections between haul truck 102 and trolley line 120 and trolley line 122 are not shown in FIG. 1. They are explained in detail below, with reference to FIG. 4. Due to high installation costs, trolley lines are typically installed only on the uphill path from position P 160 to position P 162. High power is not required on the downhill path from position P 150 to position P 152.

Figure 3:
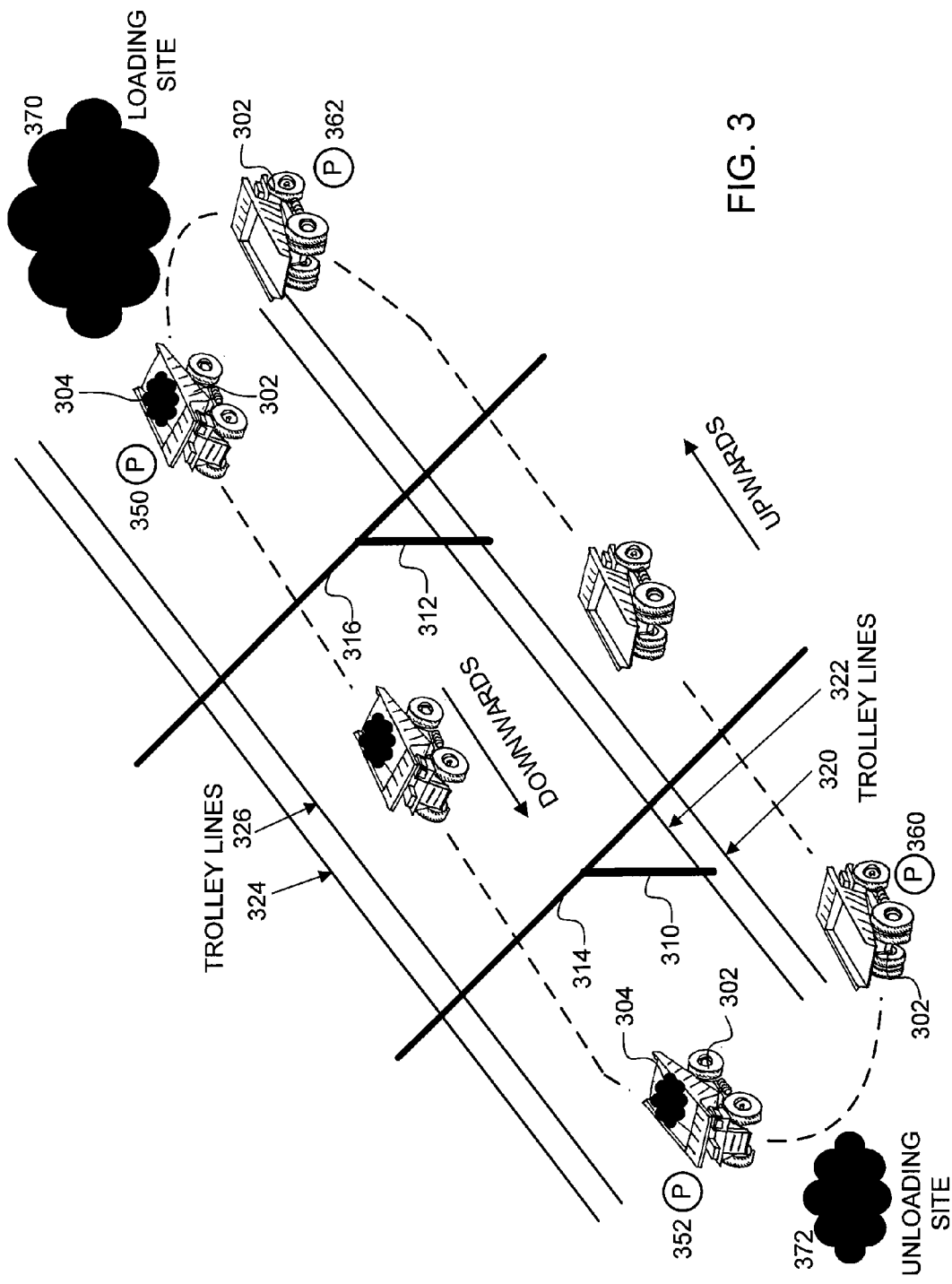
FIG. 3 shows a schematic of a mining operation in which a haul truck hauls payload downhill.

In some terrains, however, as shown in FIG. 3, the loading site 370 is located uphill from the unloading site 372. An empty haul truck 302, shown at position P 362, enters loading site 370 at the top of the hill, where it fills up with payload 304. Haul truck 302 with payload 304, shown at position P 350, starts its downhill descent, reaching the bottom of the hill, shown at position P 352. Haul truck 302 then dumps its payload 304 at unloading site 372. The empty haul truck 302, shown at position P 360, then starts its uphill climb, arriving again at position P 362. It then fills up with a second payload 304 at loading site 370 and repeats the downhill trip. In the scenario shown in FIG. 3, trolley lines typically are not installed. Since the haul truck 302 carries no load during the uphill climb from position P 360 to position P 362, power from a diesel engine is typically adequate. Similarly, during the downhill descent from position P 350 to position P 352, gravitational force reduces the power demand for haul truck 302 with payload 304. As described below, however, according to embodiments, trolley lines are advantageous in the scenario shown in FIG. 3 (both downhill and uphill) and also in the downhill leg shown in FIG. 1 (position P 150 to position P 152).

Braking of a haul truck is a critical part of the transport operation. Heavy loads, steep grades, and fast movements result in large quantities of mechanical energy which needs to be managed. In FIG. 3, for example, control of haul truck 302, with heavy payload 304, is particularly critical during the downhill descent from position P 350 to position P 352. A haul truck is typically equipped with a mechanical braking system and an electrical braking system (the electrical braking system is also referred to as a dynamic braking system).

Under normal operation, an electrical motor converts electrical energy into mechanical energy. An electrical motor may also be operated in reverse as a generator to convert mechanical energy into electrical energy, which is fed into inverters. In typical dynamic braking systems, braking choppers, connected to the inverters, channel the power into a power resistor grid that continuously dissipates the energy until the truck reaches standstill. Braking is smooth, similar to the braking operation in a car, but without mechanical brake wear. Referring to FIG. 2, for example, chopper 218 and power resistor grid 220 provide the braking action for wheel motor 212. Similarly, chopper 222 and power resistor grid 224 provide the braking action for wheel motor 220. In typical dynamic braking systems, therefore, the regenerated electrical energy (also referred to as retard energy) is converted into waste heat. In embodiments, as described in detail below, however, the regenerated electrical energy is captured and recycled.

Figure 4:
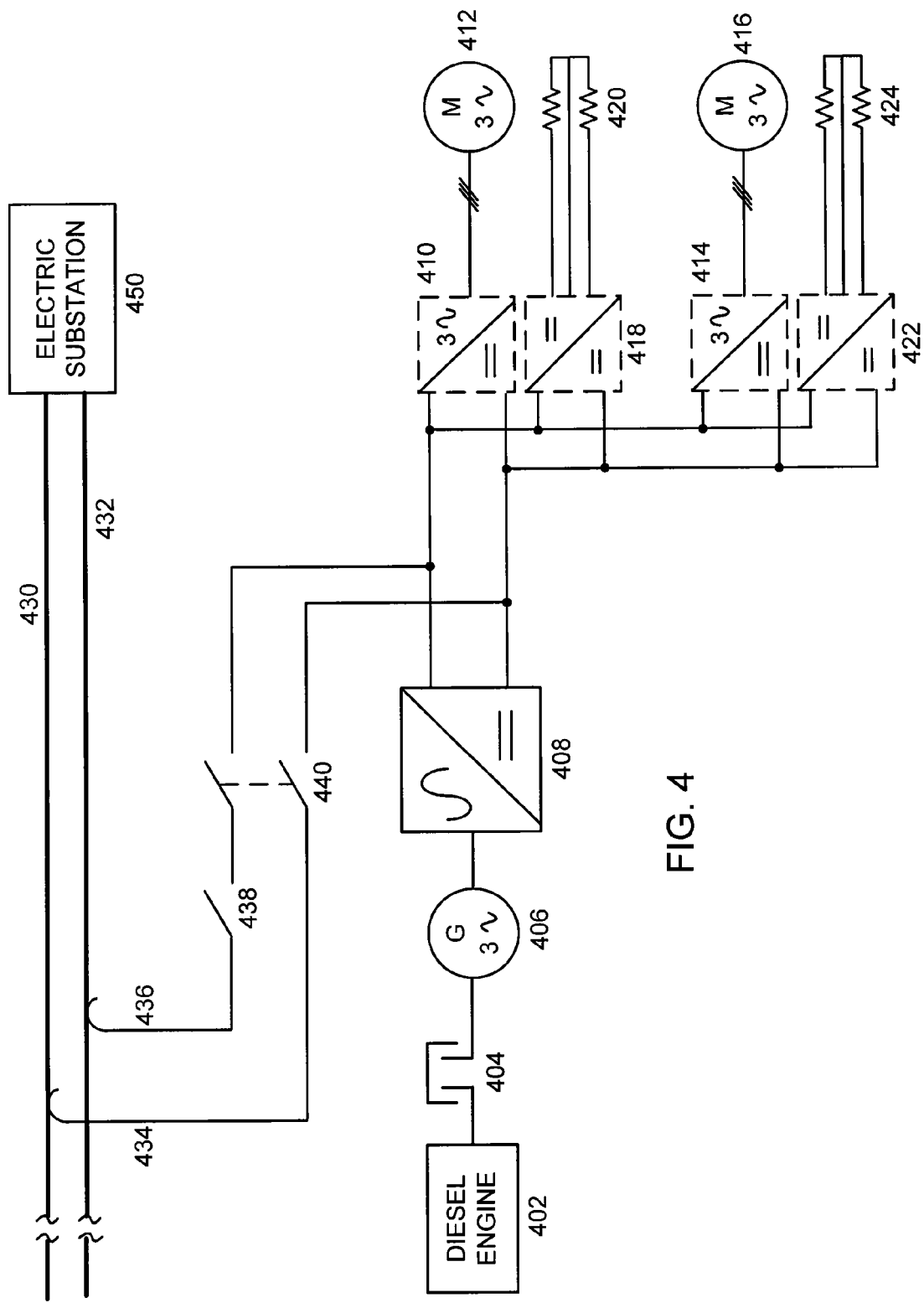
FIG. 4 shows a single-line diagram of a trolley power system for a haul truck.

FIG. 4 shows a single-line diagram of a haul truck power system including an overhead trolley power system. Similar to the power system shown in FIG. 2, diesel engine 402 is connected via coupling 404 to 3-phase AC generator 406. The AC output of generator 406 is fed into rectifiers 408. The DC output of rectifiers 408 are fed into inverters 410, which provide power to wheel motor 412, and into inverters 414, which provide power to wheel motor 416. Chopper 418 and power resistor grid 420 provide dynamic braking for wheel motor 412. Similarly, chopper 422 and power resistor grid 424 provide dynamic braking for wheel motor 416.

The inputs of inverters 410 and inverters 414 may also be connected to DC power supplied by electric substation 450 via trolley line 430 and trolley line 432. In a typical installation, as shown in FIG. 1, trolley line 430 and trolley line 432 correspond to trolley line 120 and trolley line 122 that supply electrical power to haul truck 102 during the uphill climb from position P 160 to position P 162. Electrical connection of the haul truck to trolley line 430 and trolley line 432 is implemented via pantograph arm 434 and pantograph arm 436, respectively. Throw switch 440 connects/disconnects the inputs of inverters 410 and inverters 414 to trolley line 430 and trolley line 432. There is also an auxiliary breaker 438. When the haul truck is connected to trolley line 430 and trolley line 432 on an uphill grade, a large power demand is placed on the electric substation 450, resulting in a drop in DC link voltage and increased current flow through trolley line 430 and trolley line 432. As mentioned above, when the haul truck is powered by the trolley power system, diesel engine 402 is typically disconnected from generator 406 via coupling 404.

As discussed above, when a haul truck is braking, the electrical motors operate in a retard mode to provide dynamic braking, and the retard electrical energy is typically converted to waste heat. An on-board energy storage system, however, can be integrated into the haul truck power system to recover and store the retard energy. An on-board energy storage system refers to an energy storage system which travels with the haul truck (for example, mounted on the haul truck or attached to the haul truck or mounted on a trailer attached to the haul truck). The stored energy can then be used to supplement the trolley power during peak demand on an uphill haul. The on-board energy storage system can implemented with an ultracapacitor system comprising an ultracapacitor bank. The amount of energy that can be stored in the ultracapacitor system depends on the size of the ultracapacitor bank. The on-board energy storage system can also be implemented with a rechargeable battery system comprising a battery bank. The amount of energy that can be stored in the battery system depends on the size of the battery bank. Depending on the power demand of the electrical motors and the capacity of the on-board energy storage system, there may be intervals during which the electrical motors may operate on power from only the on-board energy storage system. On-board energy storage systems are described in co-pending U.S. patent application Ser. No. 12/604,580.

An ultracapacitor may provide high power densities. For increased electrical energy storage, multiple ultracapacitors may be connected in series and parallel to form an ultracapacitor bank. Electrical current flowing into an ultracapacitor charges the ultracapacitor, and electrical energy is stored via charge separation at an electrode-electrolyte interface. The stored electrical energy may then later be used to output an electrical current. To maximize the lifetime of an ultracapacitor, the ultracapacitor is not fully discharged. Typically, the ultracapacitor is discharged until its voltage drops to a minimum user-defined lower voltage limit. The lower voltage omit, for example, may be one-half of the initial fully-charged voltage.

Figure 5:
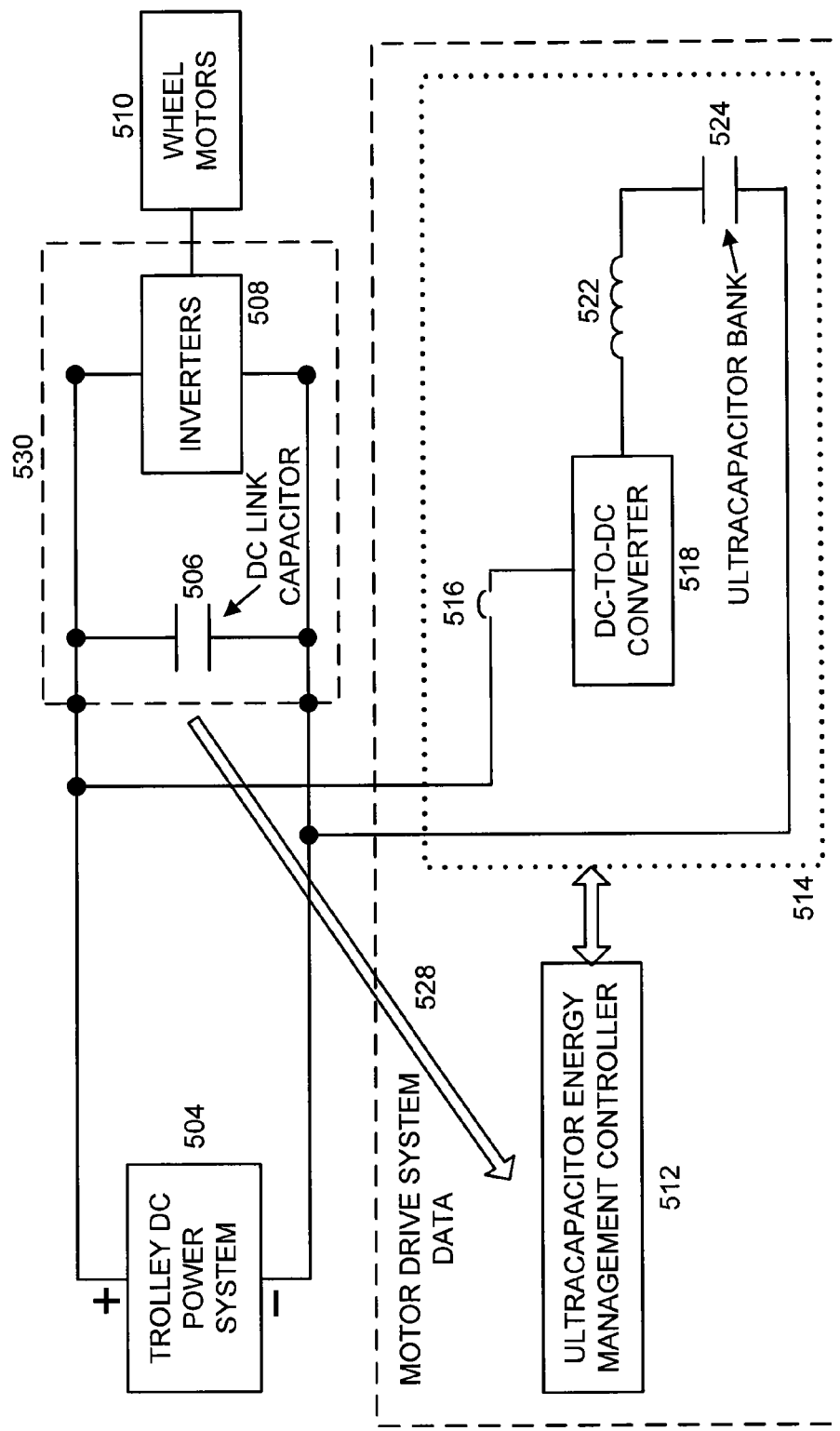
FIG. 5 shows a schematic of an electrical power system with an on-board energy storage system.

FIG. 5 shows a schematic of an electrical energy storage system 526 integrated into a trolley power system. Wheel motors 510 are powered by motor drive system 530, which includes DC link capacitor 506 and inverters 508. Trolley DC power system 504 provides DC power to motor drive system 530 via trolley lines. In an embodiment, electrical energy storage system 526 includes ultracapacitor electrical energy storage unit 514 and ultracapacitor energy management controller 512. When electrical energy storage system 526 is mounted on the haul truck, it serves as an on-board electrical energy storage system. The ultracapacitor electrical energy storage unit 514 comprises UC-to-UC converter 518, choke/reactor 522, and ultracapacitor bank 524. The ultracapacitor electrical energy storage unit 514 may be disconnected from the motor drive system 530 via connect/disconnect switch 516. The ultracapacitor electrical energy storage unit 514 is managed by ultracapacitor energy management controller 512. Ultracapacitor energy management controller 512 may also receive motor drive system data 528, which characterizes operation of the motor drive system 530. Motor drive system data 528 includes, for example, DC link voltage, current, and temperature.

In one example, a typical DC link voltage (voltage across DC link capacitor 506) is 1800 V. One string of 14 ultracapacitors in series can supply a continuous current of 150 A, operating at 1750 V, corresponding to an available energy of 1354 watt-hrs. When the haul truck engages the trolley power system in the propel mode, the ultracapacitor bank 524 discharges to DC link capacitor 506 via choke/reactor 522, DC-to-DC converter 518, and connect/disconnect switch 516. Ultracapacitor bank 524 supplies energy to the haul truck until the ultracapacitor bank voltage (voltage across the ultracapacitor bank 524) drops to a user-defined lower limit (for example, half its initially charged voltage). At this point, the ultracapacitor bank 524 is disconnected from the DC link capacitor 506 via connect/disconnect switch 516, and normal operation continues on the trolley. During the retard mode, the ultracapacitor bank 524 charges via connect/disconnect switch 516, DC-to-DC converter 518, and choke/reactor 522.

Note that ultracapacitor bank 524 may also be charged from other electrical power sources (also referred to as auxiliary power supplies). For example, ultracapacitor bank 524 may be charged by diesel engine 402 and generator 406 (see FIG. 4) when diesel engine 402 is idling. As another example, ultracapacitor bank 524 may be charged with electrical power supplied by trolley DC power system 504.

As discussed above, trolley lines are typically not installed on downhill grades. Referring back to FIG. 1, on the uphill path from position P 160 to position P 162, the wheel motors on the haul truck operate in the propel mode during most intervals. Depending on the terrain, the wheel motors may also operate in the retard mode during certain intervals. Retard energy regenerated from the wheel motors in the retard mode may be stored in an on-board energy storage unit. Stored energy is consumed during the propel mode.

On the downhill path, the haul truck operates on the diesel engine alone. It brakes more frequently and therefore operates in the retard mode more frequently. Stored energy is saved to assist in powering the haul truck on the uphill path. Depending on the terrain, the amount of retard energy available on the downhill path may exceed the storage capacity of the on-board energy storage system. The excess retard energy is then converted to waste heat by choppers and power resistor grids.

In an embodiment (see FIG. 3), trolley line 324 and trolley line 326 are installed on the downhill path between position P 350 and position P 352. Trolley line 324 and trolley line 326 are supported overhead by support arm 314 mounted on support pole 310 and by support arm 316 mounted on support pole 312. Trolley line 324 and trolley line 326 are used to transfer retard energy from the electrical motors in the haul truck 302 during intervals in which the electrical motors are operating in the retard mode (that is, the haul truck 302 is braking). With the heavy payload 350, substantial amounts of retard energy may be regenerated.

Figure 6:
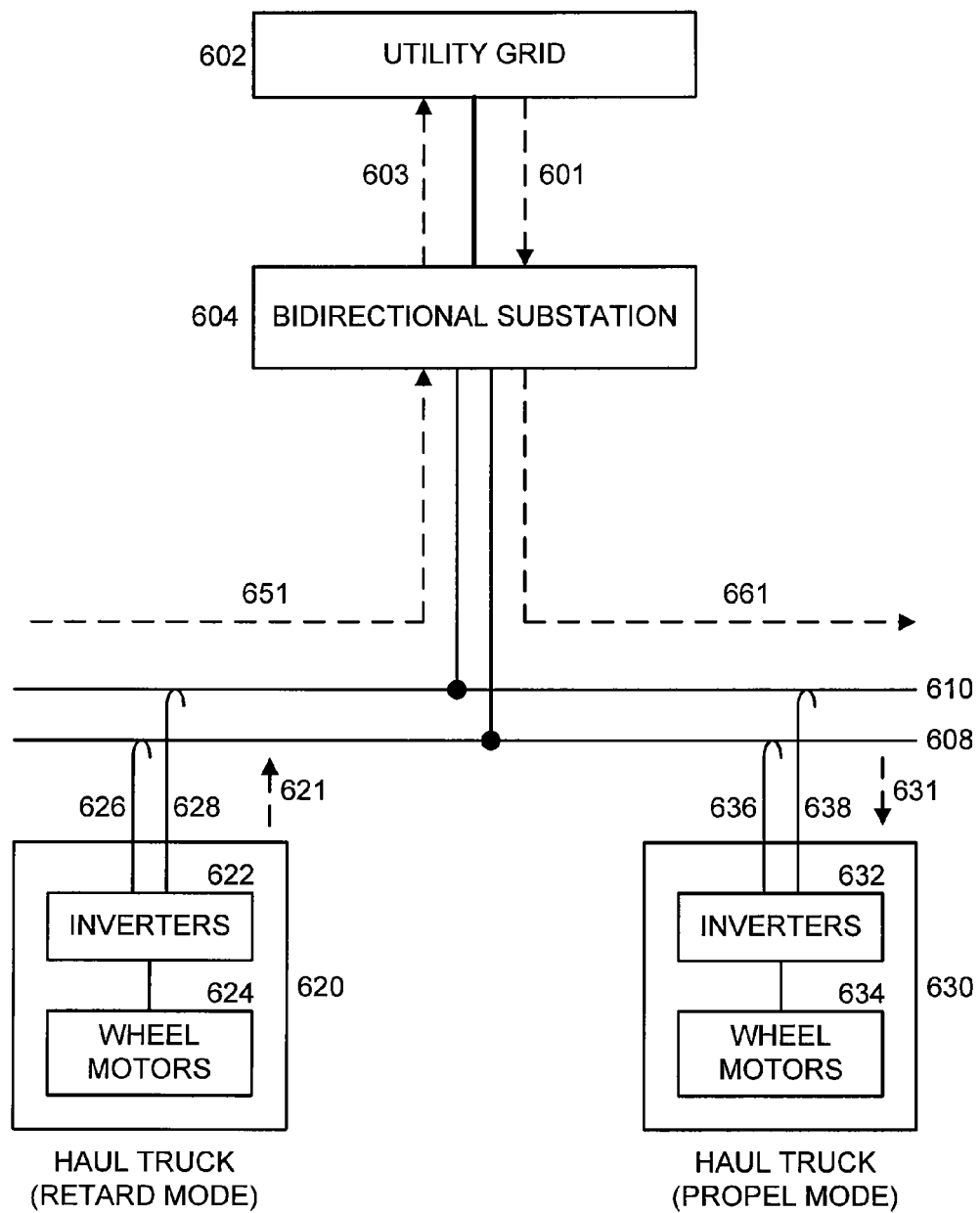
FIG. 6 shows a schematic of an electrical power system in which retard energy is returned to a utility grid.
Figure 7:
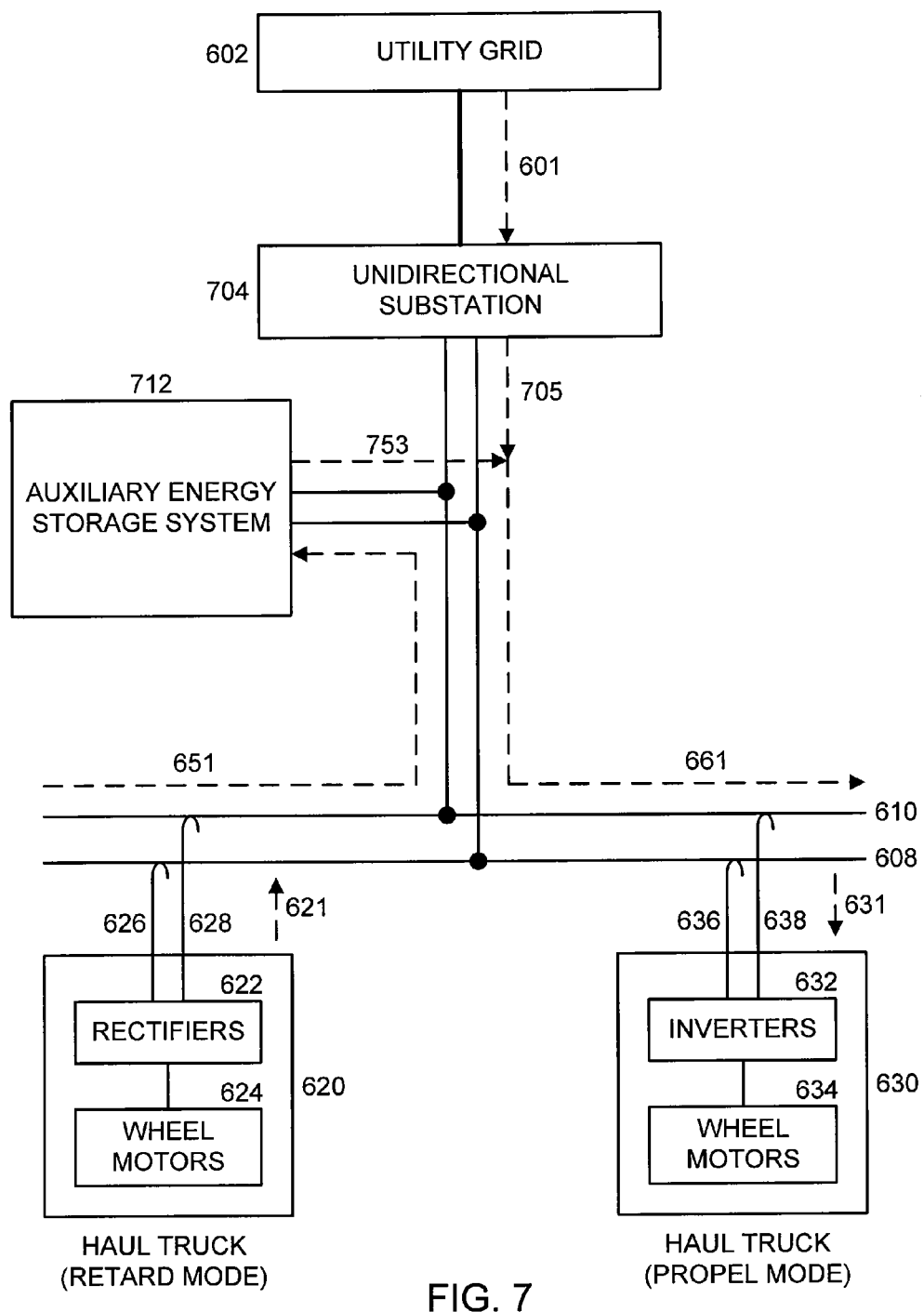
FIG. 7 shows a schematic of an electrical power system in which retard energy is stored in an auxiliary energy storage system.
Figure 8:
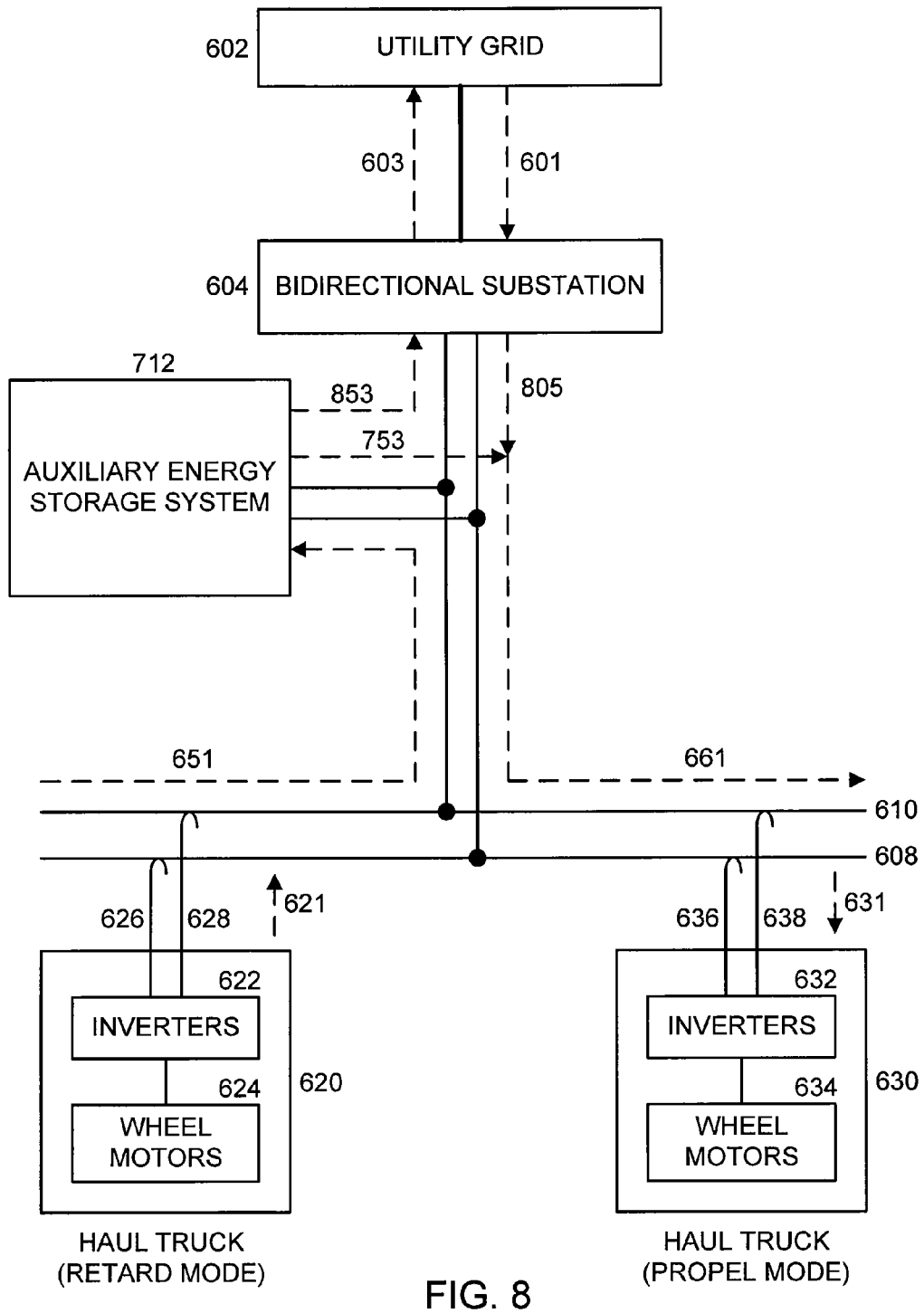
FIG. 8 shows a schematic of an electrical power system in which a portion of retard energy is stored in an auxiliary energy system and a portion of retard energy is returned to a utility grid.

FIG. 6 shows a schematic of an embodiment in which electrical energy is transferred to and from a utility grid via a bidirectional electric substation (a bidirectional electric substation can both draw power from and return power to a utility grid). For simplicity, a single haul truck in the propel mode and a single haul truck in the retard mode are shown connected to the trolley lines. In general, multiple haul trucks in the propel mode and multiple haul trucks in the retard mode may be simultaneously connected to the trolley lines. The operating mode in which power is drawn from the utility grid is first described. In FIG. 6-FIG. 8, haul truck 620 and haul truck 630 are not equipped with on-board energy storage systems. Haul truck 630 is operating in the propel (drive) mode. Utility grid 602 supplies high-voltage AC to bidirectional substation 604. Bidirectional substation 604 supplies high-voltage DC to trolley line 608 and trolley line 610. DC is transferred from trolley line 608 and trolley line 610 via pantograph arm 636 and pantograph arm 638, respectively, to inverters 632, which feed wheel motors 634. In the propel mode, acceleration energy is transmitted from utility grid 602 to haul truck 630: AC power 601 from utility grid 602 to bidirectional substation 604; DC power 661 from bidirectional substation 604 to trolley line 608 and trolley line 610; and DC power 631 from trolley line 608 and trolley line 610 to haul truck 630. DC power 661 refers to the total power supplied to trolley line 608 and trolley line 610.

In an embodiment, retard energy is returned to the utility grid. Haul truck 620 is operating in the retard mode. Retard energy from wheel motors 624 is fed into inverters 622. The output DC from inverters 622 is fed to trolley line 608 and trolley line 610 via pantograph arm 626 and pantograph arm 628, respectively. The retard DC is transmitted back to bidirectional substation 604, which inverts the DC to AC and transmits the AC back to utility grid 602. In the retard mode, retard energy is transferred from the haul truck 620 to the utility grid 602: DC power 621 from haul truck 620 to trolley line 626 and trolley line 628; DC power 651 from trolley line 626 and trolley line 628 to bidirectional substation 604; and AC power 603 from bidirectional substation 604 to utility grid 602. DC power 651 refers to the total DC power returned from trolley line 608 and trolley line 610. Depending on total power demands at any instance, retard energy from a haul truck in retard mode may be delivered via the trolley lines to a haul truck in propel mode.

FIG. 7 shows a schematic of an embodiment in which the retard energy is transferred to an auxiliary energy storage system. As previously shown in FIG. 6, retard energy from haul truck 620 is returned to trolley line 608 and trolley line 610 (DC power 621). The total retard DC power 651 from trolley line 608 and trolley line 610 is fed into auxiliary energy storage system 712, which may be located at the unidirectional substation 704 or at some other site. Auxiliary energy storage system 712 is not mounted on the haul truck. In an embodiment, auxiliary energy storage system 712 is an ultracapacitor electrical energy storage system, similar to the ultracapacitor electrical energy storage system 526 previously shown in FIG. 5. Auxiliary energy storage system 712 includes an ultracapacitor energy management controller and an ultracapacitor electrical energy storage unit with an ultracapacitor bank (not shown).

Auxiliary energy storage system 712 can have a substantially larger energy storage capacity than an on-board ultracapacitor electrical energy storage system. Note that auxiliary energy storage system 712 may also be charged by other power sources. For example, it may be charged by power from unidirectional substation 704 during off-peak times. A unidirectional substation draws power from a utility grid but does not return power to the utility grid. Other energy storage systems, such as battery systems, may be used for auxiliary energy storage system 712.

Power is fed to trolley line 608 and trolley line 610 from both the utility grid 602 and the auxiliary energy storage system 712. Haul truck 630 is operating in the propel (drive) mode. Utility grid 602 supplies high-voltage AC to unidirectional substation 704. Unidirectional substation 704 supplies high-voltage DC to trolley line 608 and trolley line 610. DC is transferred from trolley line 608 and trolley line 610 via pantograph arm 636 and pantograph arm 638, respectively, to inverters 632, which feed wheel motors 634. In the propel mode, acceleration energy is transmitted from utility grid 602 to haul truck 630: AC power 601 from utility grid 602 to unidirectional substation 704; DC power 705 from unidirectional substation 704 to trolley line 608 and trolley line 610; and DC power 631 from trolley line 608 and trolley line 610 to haul truck 630, DC power 753 may also be fed to trolley line 608 and trolley line 610 from auxiliary energy storage system 712. DC power 661 represents the total DC power supplied to trolley line 708 and trolley line 710. Auxiliary energy storage system 712 may be used to reduce peak demand from utility grid 602. Note that in addition to supplying power for trolley line 608 and trolley line 610, utility grid 602 and auxiliary energy storage system 712 may supply power for various other mining operations (for example, general operations such as lighting and other electrical mining equipment such as excavators).

In the embodiment shown in FIG. 8, auxiliary energy storage system 712 is used in conjunction with bidirectional substation 604. Retard energy 651 from trolley line 608 and trolley line 610 is first used to charge auxiliary energy storage system 712. If auxiliary energy storage system 712 is fully charged, excess retard energy is returned to the utility grid (DC power 853 from auxiliary energy storage system 712 to bidirectional substation 604 and AC power 603 from bidirectional substation 604 to utility grid 602.

In an embodiment (see FIG. 3), trolley line 320 and trolley line 322 are installed on the uphill path from position P 360 to position P 362. Even though haul truck 302 has no payload during the uphill climb, it may be advantageous to supply trolley power under certain circumstances (for example, if the grade is sufficiently steep). Retard energy regenerated during the uphill climb may also be recycled. Similarly, in an embodiment, trolley lines are installed in the downhill path in FIG. 1 from position P 150 to position P 152 to recycle the retard energy.

Figure 9:
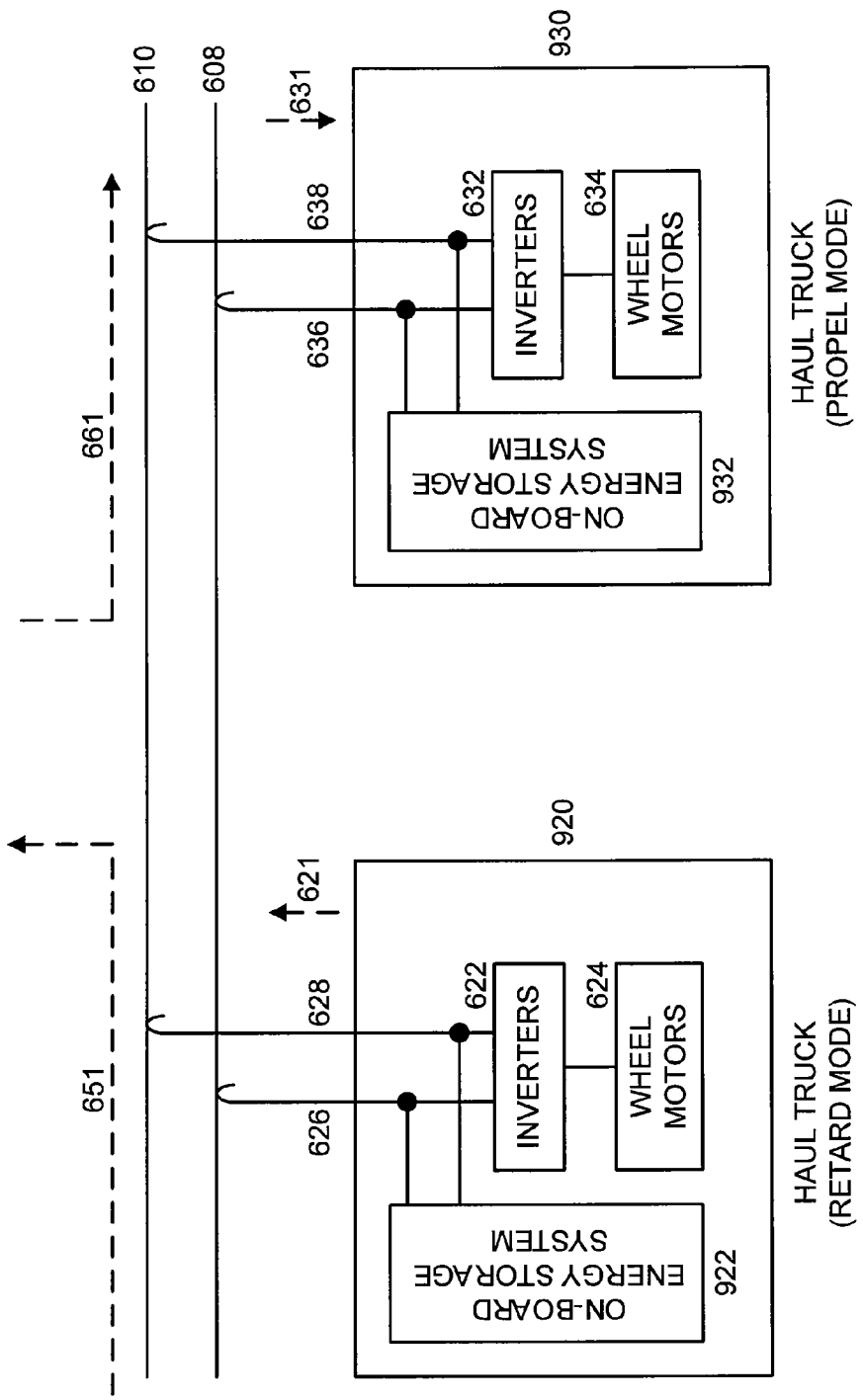
FIG. 9 shows a schematic of an electrical power system in which a portion of retard energy is stored in an on-board energy storage system and a portion of the retard energy is returned to the trolley lines.

In an embodiment (FIG. 9), retard energy is first captured by an on-board energy storage system. Once the on-board energy system has been fully charged, excess retard energy is fed back via trolley lines to the substation or auxiliary energy storage system. Haul truck 922, operating in the retard mode, is equipped with on-board energy storage system 922. Similarly, haul truck 930, operating in propel mode, is equipped with on-board energy storage system 932. Ultracapacitor electrical energy storage system 526 (see FIG. 5) is an example of on-board energy storage system 922 or on-board energy storage system 932.

Figure 10:
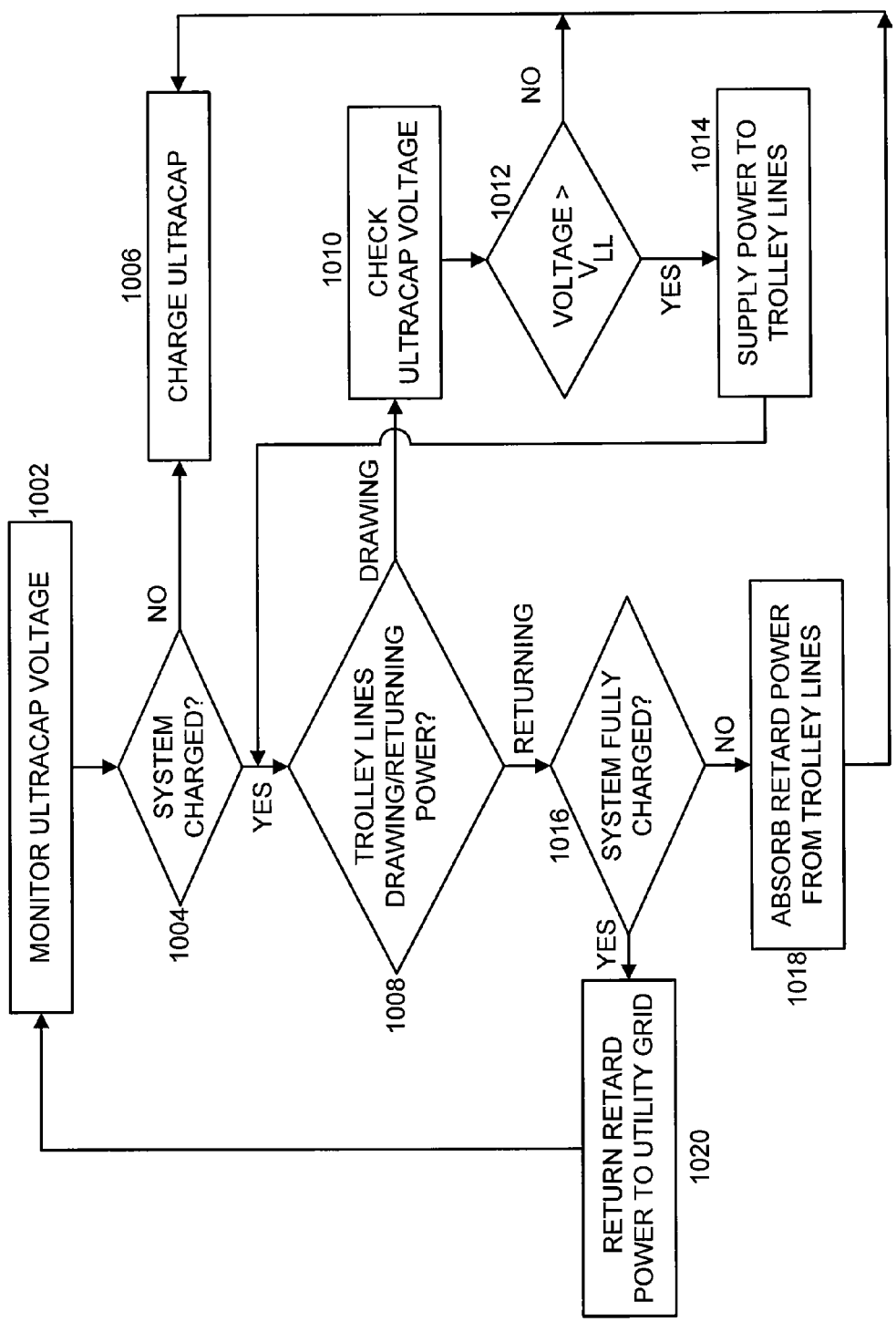
FIG. 10 shows a flowchart of steps for managing control of retard energy.

FIG. 10 shows a flowchart of steps for reducing power drawn from the utility grid in the power system shown in FIG. 8. In one embodiment, the steps are performed by the ultracapacitor energy management controller in auxiliary energy storage system 712. In step 1002, the voltage of the ultracapacitor bank in auxiliary energy storage system 712 is monitored. The process then passes to step 1004, in which the charge state of the ultracapacitor bank is determined. In an embodiment, the ultracapacitor bank is considered to be charged if the ultracapacitor bank voltage is greater than a user-specified value $V_0$ (within a user-specified tolerance). If the ultracapacitor bank is not charged, then the process passes to step 1006, in which ultracapacitor bank is charged. The ultracapacitor bank may be charged, for example, by bidirectional substation 604.

If the ultracapacitor bank is charged, then the process passes to step 1008, in which the power state of trolley line 608 and trolley line 610 is determined. If the trolley lines are drawing power, then the process passes to step 1010, in which the ultracapacitor bank voltage is checked. The process then passes to step 1012, in which the ultracapacitor bank voltage is compared to a user-specified lower-limit voltage $V_{LL}$. As discussed above, some system designs set $V_{LL}=V_0/2$. If the ultracapacitor bank voltage is greater than $V_{LL}$, then the process passes to step 1014, in which power is supplied by the ultracapacitor bank to the trolley lines. The process then returns to step 1008. The ultracapacitor bank continues to supply power to the trolley lines as long as the trolley lines are drawing power, and the ultracapacitor bank voltage is greater than $V_{LL}$. Referring back to step 1012, if the ultracapacitor bank voltage is not greater than $V_{LL}$, then the process returns to step 1006, in which the ultracapacitor bank is charged.

Referring back to step 1008, if the trolley lines are returning DC power (retard energy), then the process passes to step 1016, in which the charge state of the ultracapacitor bank is checked. If the ultracapacitor bank is not fully charged, then the process passes to step 1018, in which the retard power is absorbed from the trolley lines. The fully charged state may be specified, for example, by a maximum voltage limit across the ultracapacitor bank. The process then returns to step 1006, in which the retard power is used to charge the ultracapacitor bank. Referring back to step 1016, if the ultracapacitor bank is fully charged, then the process passes to the step 1020, in which the excess retard power is returned to the bidirectional substation 604 and returned to the utility grid 602.

In an embodiment, electrical energy stored in auxiliary energy storage system 712 is used to reduce peak demand from utility grid 602. The ultracapacitor energy management controller monitors the power drawn from the bidirectional substation 604. Electrical power is supplied from the auxiliary energy storage system to the trolley lines only when the electrical power drawn from the bidirectional substation 604 exceeds an upper power limit. One skilled in the art may develop various algorithms to control power usage from auxiliary energy storage system 712.

Figure 11:
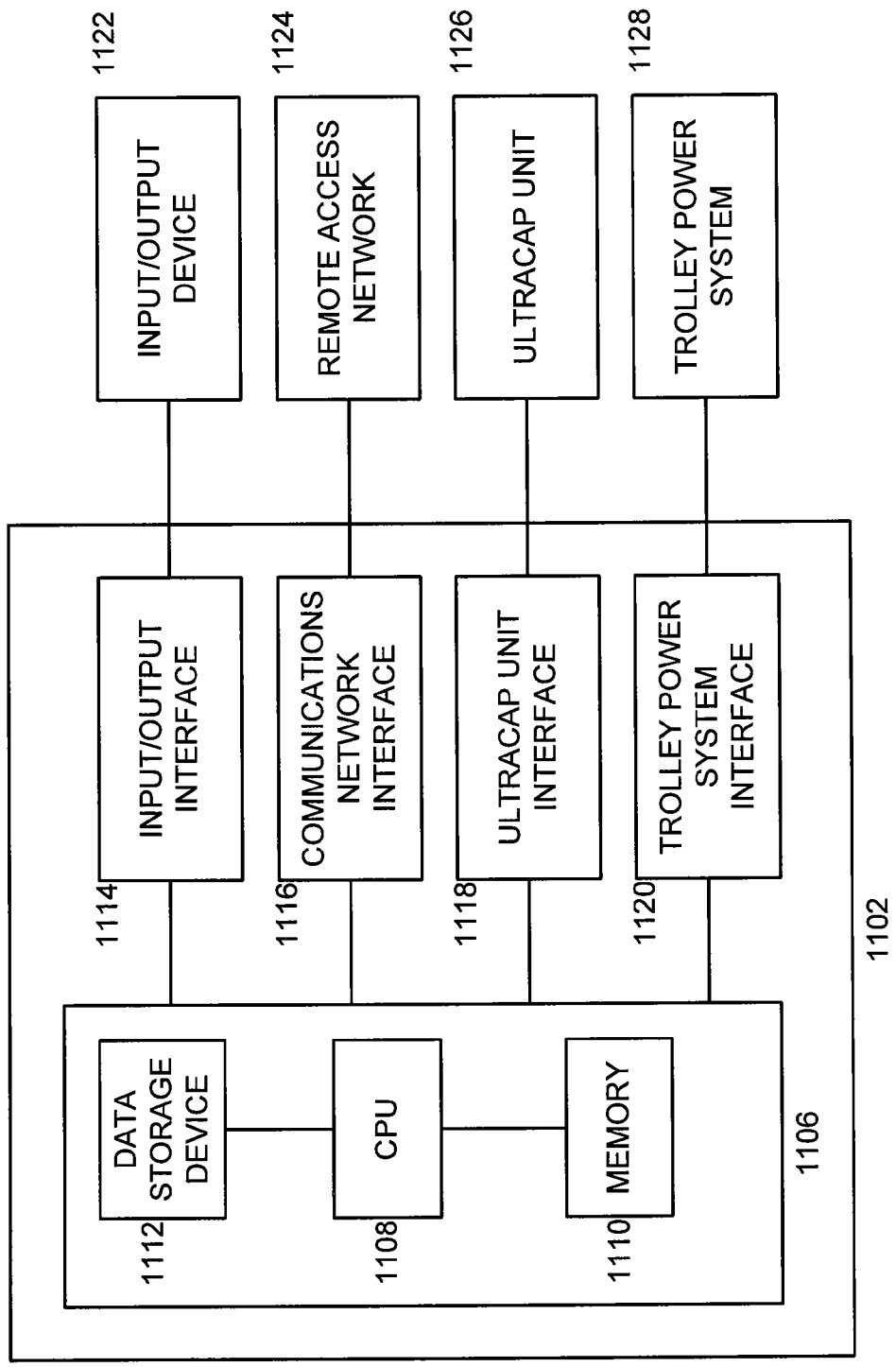
FIG. 11 a schematic of a ultracapacitor energy management controller.

Embodiments have been described with reference to a mining haul truck. One skilled in the art may develop embodiments for other vehicles driven by electrical motors, An embodiment of a computational system for implementing the ultracapacitor energy management controller in auxiliary energy storage system 712 is shown in FIG. 11. The computational system 1102 may be located with the auxiliary energy storage system 712; however, other locations are possible (for example, via a remote connection). One skilled in the art may construct the computational system 1102 from various combinations of hardware, firmware, and software. One skilled in the art may construct the computational system 1102 from various electronic components, including one or more general purpose microprocessors, one or more digital signal processors, one or more application-specific integrated circuits (ASICs), and one or more field-programmable gate arrays (FPGAs).

Computational system 1102 comprises computer 1106, which includes a central processing unit (CPU) 1108, memory 1110, and data storage device 1112. Data storage device 1112 comprises at least one persistent, tangible computer readable medium, such as non-volatile semiconductor memory, a magnetic hard drive, and a compact disc read only memory. In an embodiment, computer 1106 is implemented as an integrated device.

Computational system 1102 may further comprise user input/output interface 1114, which interfaces computer 1106 to user input/output device 1122. Examples of input/output device 1122 include a keyboard, a mouse, and a local access terminal. Data, including computer executable code, may be transferred to and from computer 1106 via input/output interface 1114.

Computational system 1102 may further comprise communications network interface 1116, which interfaces computer 1106 with remote access network 1124. Examples of remote access network 1124 include a local area network and a wide area network (communications links may be wireless). A user may access computer 1106 via a remote access terminal (not shown). Data, including computer executable code, may be transferred to and from computer 1106 via communications network interface 1116.

Computational system 1102 may further comprise ultracapacitor electrical energy storage unit interface 1118, which interfaces computer 1106 with the ultracapacitor electrical energy storage unit in auxiliary energy storage system 712 (see FIG. 7). Computational system 1102 may further comprise trolley power system interface 1120, which interfaces computer 1106 with trolley power system 1128. Trolley power system interface 1120, for example, receives trolley power system data from trolley lines 608 and trolley line 610 and bidirectional substation 604.

As is well known, a computer operates under control of computer software, which defines the overall operation of the computer and applications. CPU 1108 controls the overall operation of the computer and applications by executing computer program instructions which define the overall operation and applications. The computer program instructions may be stored in data storage device 1112 and loaded into memory 1110 when execution of the program instructions is desired. The method steps shown in the flowchart in FIG. 10 may be defined by computer program instructions stored in the memory 1110 or in the data storage device 1112 (or in a combination of memory 1110 and data storage device 1112) and controlled by the CPU 1108 executing the computer program instructions. For example, the computer program instructions may be implemented as computer executable code programmed by one skilled in the art to perform algorithms implementing the method steps shown in the flowchart in FIG. 10. Accordingly, by executing the computer program instructions, the CPU 1108 executes algorithms implementing the method steps shown in the flowchart in FIG. 10.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for reinjecting retard energy regenerated from an electrical motor on a mining haul truck, the method comprising the steps of:
    operably coupling the mining haul truck to trolley lines before the mining haul truck travels downhill; and
    transmitting via the trolley lines at least a portion of the retard energy regenerated during at least one retard interval to a bidirectional electric substation, wherein the at least one retard interval occurs while the mining haul truck is travelling downhill.

2. The method of claim 1 further comprising the step of:
    charging an on-board electrical energy storage system with at least a portion of the retard energy.

3. The method of claim 2, wherein:
    the on-board electrical energy storage system comprises at least one ultracapacitor.

4. The method of claim 2, wherein:
    the on-board electrical energy storage system comprises at least one battery.

5. The method of claim 2, further comprising the step of:
    supplying electrical power to the electrical motor from the on-board electrical energy storage system.

6. A method for storing retard energy regenerated from an electrical motor on a vehicle, the method comprising the steps of:
    determining whether an on-board electrical energy storage system is fully charged;
    upon determining that the on-board electrical energy storage system is not fully charged:
        transmitting at least a portion of the retard energy to the on-board electrical energy storage system; and
        charging the on-board electrical energy storage system with at least a portion of the retard energy; and
    upon determining that the on-board electrical energy storage system is fully charged:
        transmitting via trolley lines at least a portion of the retard energy to an auxiliary electrical energy storage system; and
        charging the auxiliary electrical energy storage system with at least a portion of the retard energy.

7. The method of claim 6, wherein:
    the vehicle comprises a mining haul truck.

8. The method of claim 7, wherein:
the step of transmitting via trolley lines at least a portion of the retard energy to an auxiliary electrical energy storage system occurs while the mining haul truck is travelling downhill.

9. The method of claim 6, wherein:
the auxiliary electrical energy storage system comprises at least one ultracapacitor.

10. The method of claim 6, wherein:
the auxiliary electrical energy storage system comprises at least one battery.

11. The method of claim 6, further comprising the step of:
transmitting at least a portion of the retard energy to a unidirectional electric substation via at least one of:
the trolley lines; or
the auxiliary electrical energy storage system.

12. The method of claim 11, further comprising the step of:
charging the auxiliary electrical energy storage system with electrical power supplied from the unidirectional electric substation.

13. The method of claim 6, further comprising the step of:
transmitting at least a portion of the retard energy to a bidirectional electric substation via at least one of:
the trolley lines; or
the auxiliary electrical energy storage system.

14. The method of claim 13, further comprising the step of:
charging the auxiliary electrical energy storage system with electrical power supplied from the bidirectional electric substation.

15. The method of claim 6 further comprising the step of:
supplying electrical power to the trolley lines from the auxiliary electrical energy storage system.

16. The method of claim 6, wherein:
the on-board electrical energy storage system comprises at least one ultracapacitor.

17. The method of claim 6, wherein:
the on-board electrical energy storage system comprises at least one battery.

18. The method of claim 6, further comprising the step of:
supplying electrical power to the electrical motor from the on-board electrical energy storage system.

\* \* \* \* \*